(12) United States Patent
Rahman

(10) Patent No.: US 12,707,412 B2
(45) Date of Patent: Aug. 11, 2026

(54) DENIAL OF 5G SA COVERAGE WHEN 4G IS NOT AVAILABLE

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 299 days.

(21) Appl. No.: 18/529,922

(22) Filed: Dec. 5, 2023

(65) Prior Publication Data

US 2025/0184939 A1 Jun. 5, 2025

(51) Int. Cl.
*H04W 60/00* (2009.01)
*H04W 48/18* (2009.01)

(52) U.S. Cl.
CPC .......... *H04W 60/00* (2013.01); *H04W 48/18* (2013.01)

(58) Field of Classification Search
CPC .............................. H04W 60/00; H04W 48/18
See application file for complete search history.

(56) References Cited

U.S. PATENT DOCUMENTS

2020/0267605 A1* 8/2020 Bae ................. H04W 36/00222
2023/0164727 A1* 5/2023 Wei ......................... H04W 4/14 455/435.1
2023/0337166 A1* 10/2023 Wang .................... H04W 60/04
2024/0107382 A1* 3/2024 Lei ........................ H04W 36/30
2024/0334319 A1* 10/2024 Dhanapal ............ H04W 72/542

* cited by examiner

*Primary Examiner* — Ankur Jain
(74) *Attorney, Agent, or Firm* — Lee & Hayes, P.C.

(57) ABSTRACT

Described herein are device(s) of a Fifth Generation (5G) network configured to receive, from a user equipment (UE) a registration request for 5G standalone (SA) coverage and to determine that Fourth Generation (4G) coverage from the telecommunications network is not available to the UE. The device(s) of the 5G network are further configured to deny the registration request in response to determining that the 4G coverage is not available to the UE and regardless of whether 5G SA coverage is available to the UE.

17 Claims, 3 Drawing Sheets

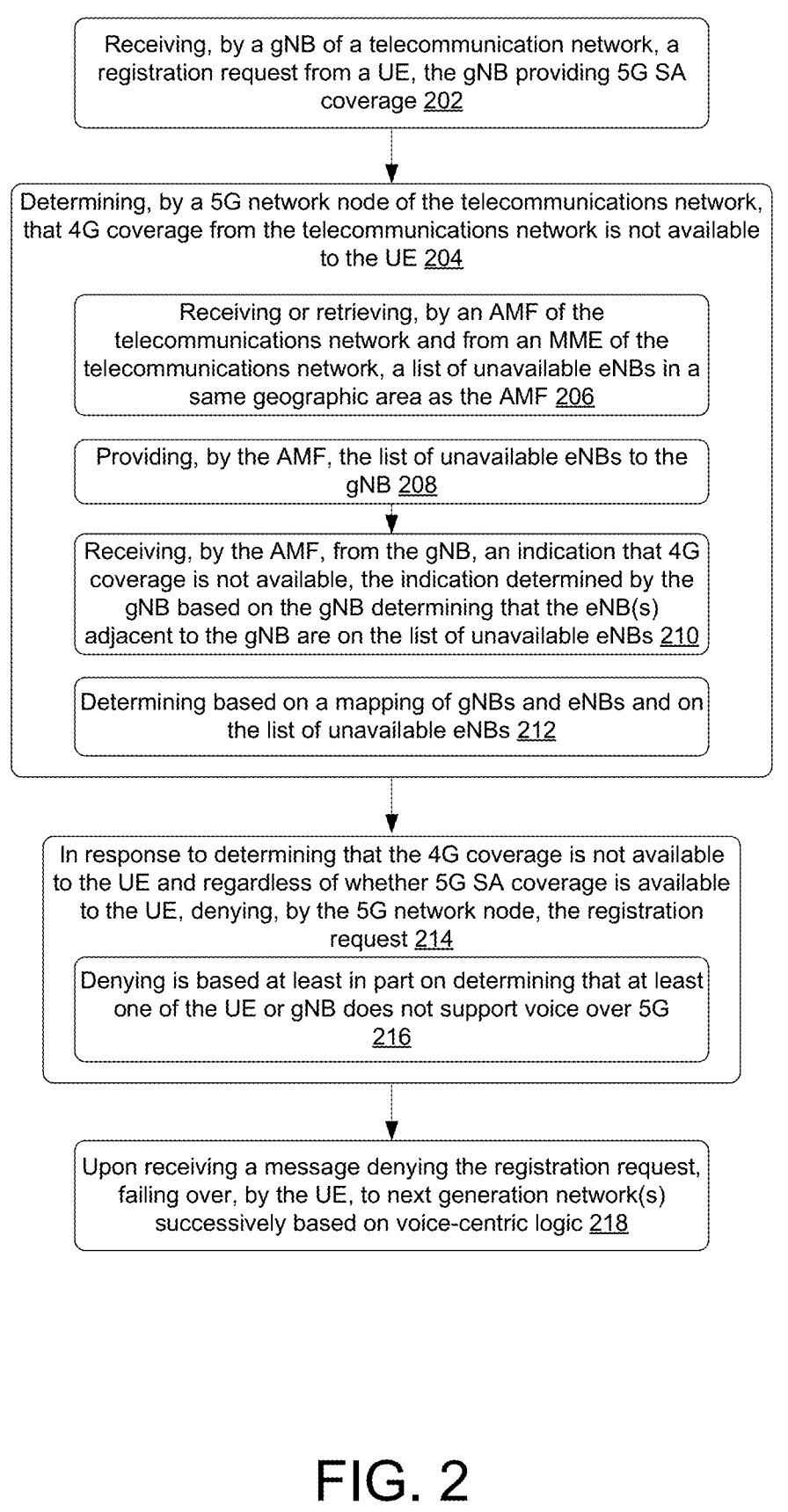

Receiving, by a gNB of a telecommunication network, a registration request from a UE, the gNB providing 5G SA coverage 202

Determining, by a 5G network node of the telecommunications network, that 4G coverage from the telecommunications network is not available to the UE 204

Receiving or retrieving, by an AMF of the telecommunications network and from an MME of the telecommunications network, a list of unavailable eNBs in a same geographic area as the AMF 206

Providing, by the AMF, the list of unavailable eNBs to the gNB 208

Receiving, by the AMF, from the gNB, an indication that 4G coverage is not available, the indication determined by the gNB based on the gNB determining that the eNB(s) adjacent to the gNB are on the list of unavailable eNBs 210

Determining based on a mapping of gNBs and eNBs and on the list of unavailable eNBs 212

In response to determining that the 4G coverage is not available to the UE and regardless of whether 5G SA coverage is available to the UE, denying, by the 5G network node, the registration request 214

Denying is based at least in part on determining that at least one of the UE or gNB does not support voice over 5G 216

Upon receiving a message denying the registration request, failing over, by the UE, to next generation network(s) successively based on voice-centric logic 218

FIG. 2

DENIAL OF 5G SA COVERAGE WHEN 4G IS NOT AVAILABLE

BACKGROUND

As Fifth Generation (5G) networks become more ubiquitous and user equipment (UEs) become increasingly capable of using 5G networks for both voice and data, more and more of the networks available to UEs will be 5G standalone (SA) networks. Many UEs will be capable of using 5G SA for data but not for voice during this changeover. Those UEs will rely upon the presence and pervasiveness of Fourth Generation (4G) coverage so that when the UEs need to make a call or receive a call they can fall back from the 5G networks to the 4G networks. While this changeover is happening, however, the number of 4G networks will decrease.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2 is a flow diagram of an illustrative process for a 5G network node to receive a registration request from a UE for 5G SA coverage, determine whether 4G coverage is available for the UE, and, regardless of whether 5G SA coverage is available, deny the registration request when 4G coverage is not available.

DETAILED DESCRIPTION

Figure 1:
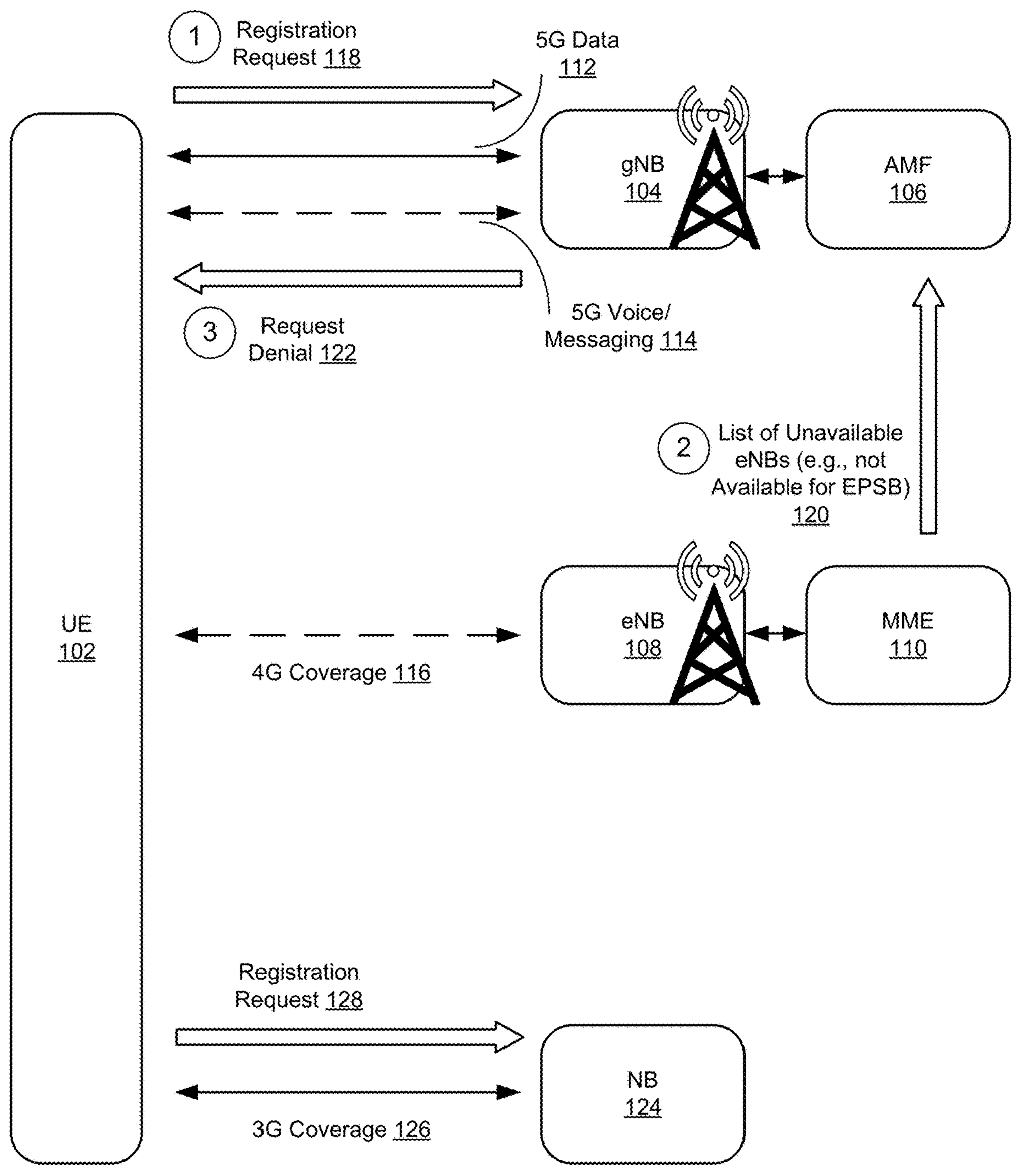
FIG. 1 is an overview diagram of nodes and operations involved in denying 5G SA coverage to a UE at a location when 4G coverage at that location is unavailable to the UE.

This disclosure is directed in part to device(s) of a 5G network configured to receive, from a UE, a registration request for 5G SA coverage and to determine that 4G coverage from the telecommunications network is not available to the UE. The device(s) of the 5G network are further configured to deny the registration request in response to determining that the 4G coverage is not available to the UE and regardless of whether 5G SA coverage is available to the UE.

In various implementations, 4G coverage may not be available in a location with 5G SA coverage. A UE in that location, capable of using 5G SA coverage for data but not for voice, may be nonetheless configured to connect to a gNodeB (gNB) gNB offering the 5G SA coverage. The configuration of the UE may have been built with the assumption that 4G coverage will be available through Evolved Packet System Fallback (EPSFB) and that connection to the gNB will thus be consistent with voice-centric logic that requires prioritization of voice availability over data. But when the 4G coverage is not available, the UE with this configuration, having connected to the gNB, may be left unable to make or receive calls. EPSFB will fail from the gNB because 4G coverage is not available. The UE will still have data but will have no voice nor ability to attain it.

This outcome is avoided, as described herein, by having the gNB and/or the access and mobility management function (AMF) connected to it determine that 4G coverage is not available when the UE is attempting to connect to the gNB and denying the connection attempt based on the lack of available 4G coverage. The UE may receive this denial of its registration request from the gNB and attempt connection to an eNodeB (eNB) but likely fail due to the lack of 4G coverage. If Third Generation (3G) coverage is available, the UE may then connect to the NodeB (NB) offering the 3G coverage. 3G voice coverage, for example, is prioritized over 5G data coverage in this approach, consistent with voice-centric logic.

In some implementations, determining the lack of 4G coverage can involve one or more mobility management entities (MMEs) in a same geographic region as an AMF reporting a list of unavailable eNBs to the AMF, either as new outages occur or periodically. The MMEs can determine that eNB(s) are unavailable based on, e.g., not receiving an attach message from an eNB for a threshold period of time. The AMF may store this list or lists of unavailable eNB(s) as, e.g., a table and, when a UE attempts to connect with the AMF (e.g., through Non-Access Stratum (NAS) signaling), the AMF can provide the list(s) of unavailable eNB(s) to the gNB. The gNB may then compare the list(s) of unavailable eNB(s) to its known neighboring eNB(s) and, if the result of the comparison indicates that no eNB(s) neighboring the gNB are available, the gNB indicates this to the AMF. The AMF, notified that no 4G coverage is available, may respond to the UE with a denial of the UE's registration request. The UE will then not connect to the gNB and will fail over to other radio access technologies in accordance with its voice-centric logic.

FIG. 1 is an overview diagram of nodes and operations involved in denying 5G SA coverage to a UE at a location when 4G coverage at that location is unavailable to the UE. As illustrated, a UE 102 may be within a signal range of a gNB 104. The gNB 104 may offer 5G SA coverage and 5G connectivity supported by AMF 106. The UE 102 may also be within a signal range of an eNB 108 that, when active and available, provides 4G connectivity supported by MME 110. The gNB 104 may provide 5G data coverage 112 and 5G voice coverage 114, but the 5G voice coverage 114 may be unavailable to the UE 102 because, e.g., of UE capabilities of UE 102. The eNB 108, when available, may provide 4G coverage 116 (both voice and data) via both direct connection and EPSFB. In FIG. 1, however, 4G coverage 116 is shown as not available. The UE 102, attempting connection to the telecommunications network, first sends a registration request, at 118, to the gNB 104. Based on the AMF 106 receiving list(s) of unavailable eNB(s), at 120, from the MME 110, the gNB 104 and/or the AMF 106 deny, at 122, the registration request. Using its voice-centric logic, the UE 102 may successively fail over to the eNB 108 and NB 124. The NB 124 may offer 3G coverage 126, and the 3G coverage 126 may include voice coverage. The UE 102 may then send a registration request, at 128, to the NB 124 and connect to the telecommunications network through it.

In various implementations, the UE 102 may be any sort of device capable of wireless communication with a telecommunications network. The UE 102 may be a cellular phone, a mobile device, a tablet computer, a personal computer (PC), a smart watch, goggles, an Internet-of-Things (IoT) device, a home Internet device, an appliance, etc. Also, the UE 102 may be configured to use multiple radio access technologies (RATs), including 5G, 4G, 3G, etc. Selection between RATs may follow voice-centric logic that selects the newest RAT so long as it supports voice, either directly or through fallback to a previous generation of RAT. The UE 102 may be capable of 5G data using, e.g., 5G data coverage 112 but not be capable of 5G voice using, e.g., 5G voice coverage. However, the gNB 104 and UE 102 may both support EPSFB, allowing the UE 102 to connect through the gNB 104 while complying with its voice-centric logic. These configurations and arrangement assume the availability of 4G coverage 116 to receive the EPSFB.

In further implementations, gNB 104 is a 5G base station, eNB 108 is a 4G base station, and NB 124 is a 3G base station. These base stations may each comprise one or more computing device(s) and may be co-located at a same cell site or located at different but geographically proximate cell sites. Each cell site can include a cell tower or other network equipment and may include antennas, antenna arrays, and backhaul lines to connect the base station(s) at the cell site to the core network(s) of the telecommunications network. gNB 104 may provide 5G data coverage 112 and 5G voice coverage 114 using frequency bands allocated for 5G coverage, the eNB 108 may provide 4G coverage 116 using frequency bands allocated for 4G coverage, and the NB 124 may provide 3G coverage 126 using frequency bands allocated for 3G coverage 126. Each of gNB 104, eNB 108, and NB 124 may have a scheduler that allocates parts of frequency bands to UE(s) that are connected to it.

The core network(s) can include a 5G core network (5GC) or components of a 5GC, including at least AMF 106. The core network(s) can also include a 4G core network—called an Evolved Packet Core (EPC)—or components of an EPC, including MME 110. The AMF 106 and MME 110 may further communicate with each other over an N26 interface.

In some implementations, the MME 110 may be part of a pool of MMEs for a geographic area with each eNB in the geographic area (including eNB 108) connected to each of the MMEs in the pool. At least one of the MMEs in the pool (e.g., MME 110) may be configured to detect if one of the eNBs (e.g., eNB 108) is unavailable. The MME 110 may detect that the eNB 108 is not available because, for example, it has not received a message (e.g., an LTE attach message) for a threshold period of time. The MME 110 may populate a list or table with unavailable eNBs that are or should be connected to the MME 110 and, upon detecting a new, unavailable eNB, may report the list/table to the AMF 106 over the N26 interface. To avoid multiple MMEs in the pool reporting the same thing to the AMF 106, one MME 110 from the pool of MMEs may be designated to report unavailable eNBs to the AMF 106. The AMF 106 receiving the list/table may be an AMF 106 associated with a same, overlapping, or proximate geographic region as the pool of MMEs.

In various implementations, the AMF 106 may be configured to provide the most recent list/table of unavailable eNBs to the gNB 104 when a registration request from the UE 102 is received through the gNB 104. The gNB 104, having knowledge of the eNBs that are geographically proximate to the gNB 104, uses the table/list to determine whether any of its neighbor eNBs are on the list/table and if any eNBs among its neighbors are available. In FIG. 1, the gNB 104 has a neighbor eNB 108 that is not available and presumably on the list/table of unavailable eNBs. Also, no other neighbor eNBs are shown in FIG. 1. In such an example, the gNB 104 may report to the AMF 106 that 4G coverage is not available to UEs attempting to connect through gNB 104. Because UE 102 is such a UE, the AMF 106 may be configured to deny the registration request. The AMF 106 may communicate this to the UE 102 though the gNB 104 using NAS signaling.

In other implementations, the gNB may be configured with a mapping of eNBs to gNBs for its geographic region and may use this mapping and an identification of the gNB 104 through which a UE 102 is connecting to determine whether there is 4G coverage available. The mapping may be used with the list/table of unavailable eNBs or may be used on its own, without information about outages.

The UE 102, upon receiving a denial response from the AMF 106 through the gNB 104, may fail over in order of RAT. If no other 5G coverage is available, the UE 102 may attempt to connect to 4G coverage 116 of eNB 108. That coverage is unavailable in this example, however, so the UE 102 may fail over again to the 3G coverage 126 of NB 124. The UE 102 may send a registration request at 128 to NB 124 and may connect via the NB 124 to receive voice and data.

FIG. 2 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 2 is a flow diagram of an illustrative process for a 5G network node to receive a registration request from a UE for 5G SA coverage, determine whether 4G coverage is available for the UE, and, regardless of whether 5G SA coverage is available, deny the registration request when 4G coverage is not available.

As illustrated at 202, a 5G network node of a telecommunications network receives a registration request from a UE for 5G SA coverage. The 5G network node may be a gNB, an AMF, or a combination of the gNB and the AMF.

At 204, the 5G network node determines that 4G coverage from the telecommunications network is not available to the UE. At 206, the determining may include receiving or retrieving, by an AMF of the telecommunications network and from an MME of the telecommunications network, a list of unavailable eNBs in a same geographic area as the AMF. In some implementations, the MME may determine the list of unavailable eNBs based on a lack of activity of each eNB in the list of unavailable eNBs exceeding a threshold time period. The determining may also or instead include providing by the AMF, at 208, the list of unavailable eNBs to a gNB and, at 210, receiving, by the AMF and from the gNB, an indication that 4G coverage is not available. The indication may be determined by the gNB based on the gNB determining that the eNB(s) adjacent to the gNB are on the list of unavailable eNBs. At 212, the determining may be based on a mapping of gNBs and eNBs and on the list of unavailable eNBs, and the 5G network node may be an AMF.

At 214, the 5G network node denies the registration request in response to determining that the 4G coverage is not available to the UE. The 5G network node denies the registration request regardless of whether 5G SA coverage is available to the UE when the 4G coverage is not available. At 216, the denying may be based at least in part on determining that at least one of the UE or gNB does not support voice over 5G.

At 218, upon receiving a message denying the registration request, the UE may fail over to next generation network(s) successively based on voice-centric logic.

Figure 3:
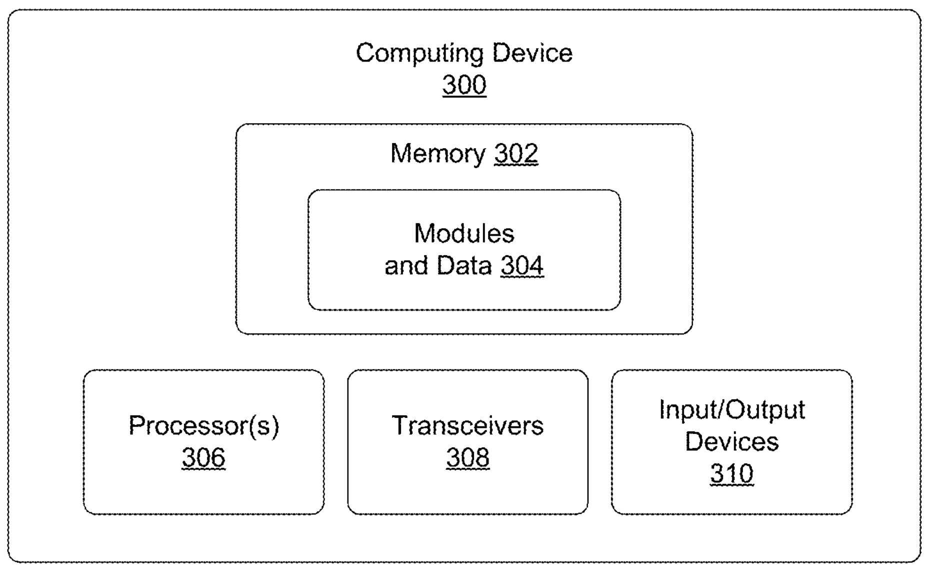
FIG. 3 is a schematic diagram of a computing device capable of implementing functionality of at least one of the device(s) of the telecommunications network.

FIG. 3 is a schematic diagram of a computing device 300 capable of implementing functionality of at least one of the device(s) of the telecommunications network, such as the gNB 104 and/or AMF 106. As shown, the computing device 300 includes a memory 302 storing modules and data 304, processor(s) 306, transceivers 308, and input/output devices 310.

In various examples, the memory 302 can include system memory, which may be volatile (such as RAM), non-volatile (such as ROM, flash memory, etc.) or some combination of the two. The memory 302 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information.

The memory 302 can include one or more software or firmware elements, such as computer-readable instructions that are executable by the one or more processors 306. For example, the memory 302 can store computer-executable instructions associated with modules and data 304. The modules and data 304 can include a platform, operating system, and applications, and data utilized by the platform, operating system, and applications. Further, the modules and data 304 can implement any of the functionality for the gNB 104, AMF 106, UE 102, eNB 108, MME 110, or any other node/device described and illustrated herein.

In various examples, the processor(s) 306 can be a central processing unit (CPU), a graphics processing unit (GPU), or both CPU and GPU, or any other type of processing unit. Each of the one or more processor(s) 306 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 406 may also be responsible for executing all computer applications stored in the memory 302, which can be associated with types of volatile (RAM) and/or nonvolatile (ROM) memory.

The transceivers 308 can include modems, interfaces, antennas, Ethernet ports, cable interface components, and/or other components that perform or assist in exchanging wireless communications, wired communications, or both.

While the computing device need not include input/output devices 310, in some implementations it may include one, some, or all of these. For example, the input/output devices 310 can include a display, such as a liquid crystal display or any other type of display. For example, the display may be a touch-sensitive display screen and can thus also act as an input device or keypad, such as for providing a soft-key keyboard, navigation buttons, or any other type of input. The input/output devices 310 can include any sort of output devices known in the art, such as a display, speakers, a vibrating mechanism, and/or a tactile feedback mechanism. Output devices can also include ports for one or more peripheral devices, such as headphones, peripheral speakers, and/or a peripheral display. The input/output devices 310 can include any sort of input devices known in the art. For example, input devices can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

Although features and/or methodological acts are described above, it is to be understood that the appended claims are not necessarily limited to those features or acts. Rather, the features and acts described above are disclosed as example forms of implementing the claims.

What is claimed is:

1. A method comprising: receiving, by a gNodeB (gNB) of a telecommunications network, a registration request from a user equipment (UE), the gNB providing Fifth Generation (5G) standalone (SA) coverage; determining, by a 5G network node of the telecommunications network, that Fourth Generation (4G) coverage from the telecommunications network is not available to the UE; and in response to determining that the 4G coverage is not available to the UE and regardless of whether 5G SA coverage is available to the UE, denying, by the 5G network node, the registration request; wherein the determining includes receiving or retrieving, by an access and mobility management function (AMF) of the telecommunications network and from a mobility management entity (MME) of the telecommunications network, a list of unavailable eNodeBs (eNBs) in a same geographic area as the AMF.

2. The method of claim 1, wherein the 5G network node is the gNB, an access and mobility management function (AMF), or a combination of the gNB and the AMF.

3. The method of claim 1, wherein the MME determines the list of unavailableeNBs based on a lack of activity of each cNB in the list of unavailable cNBs exceeding a threshold time period.

4. The method of claim 1, wherein the determining includes: providing, by the AMF, the list of unavailable eNBs to the gNB; and receiving, by the AMF, from the gNB, an indication that 4G coverage is not available, the indication determined by the gNB based on the gNB determining that eNB(s) adjacent to the gNB are on the list of unavailable eNBs, wherein the AMF performs the denying of the registration request in response to receiving the indication.

5. The method of claim 1, wherein the 5G network node is the AMF, and the AMF performs the determining based on a mapping of gNBs and eNBs and on the list of unavailable eNBs.

6. The method of claim 1, wherein the UE, upon receiving a message denying the registration request, fails over to next generation network(s) successively based on voice-centric logic.

7. The method of claim 1, wherein the denying is based at least in part on determining that at least one of the UE or gNB does not support voice over 5G.

8. A Fifth Generation (5G) system of a telecommunications network, the 5G system comprising: one or more processors; and a plurality of programming instructions that, when executed by the one or more processors, cause the 5G system to perform operations including: receiving a registration request for 5G standalone (SA) coverage from a user equipment (UE), the 5G system providing 5G SA coverage; determining that Fourth Generation (4G) coverage from the telecommunications network is not available to the UE; and in response to determining that the 4G coverage is not available to the UE and regardless of whether 5G SA coverage is available to the UE, denying the registration request; wherein the determining includes receiving or retrieving, by an access and mobility management function (AMF) of the telecommunications network and from a mobility management entity (MME) of the telecommunications network, a list of unavailable eNodeBs (eNBs) in a same geographic area as the AMF.

9. The 5G system of claim 8, wherein the 5G system includes a gNodeB (gNB), an access and mobility management function (AMF), or a combination of the gNB and the AMF.

10. The 5G system of claim 8, wherein the MME determines the list of unavailable eNBs based on a lack of activity of each eNB in the list of unavailable eNBs exceeding a threshold time period.

11. The 5G system of claim 8, wherein the determining includes: providing, by the AMF, the list of unavailable eNBs to a gNodeB (gNB) of the telecommunications network; and receiving, by the AMF, from the gNB, an indication that 4G coverage is not available, the indication determined by the gNB based on the gNB determining that eNB(s) adjacent to the gNB are on the list of unavailable eNBs, wherein the AMF performs the denying of the registration request in response to receiving the indication.

12. The 5G system of claim 8, wherein the 5G system includes the AMF, and the AMF performs the determining based on a mapping of a gNodeBs (gNBs) of the telecommunications network and of eNBs and on the list of unavailable eNBs.

13. The 5G system of claim 8, wherein the UE, upon receiving a message denying the registration request, fails over to next generation network(s) successively based on voice-centric logic.

14. The 5G system of claim 8, wherein the denying is based at least in part on determining that at least one of the UE or a gNodeB (gNB) of the telecommunications network does not support voice over 5G.

15. A non-transitory computer storage medium having a plurality of programming instructions stored thereon that, when executed by one or more processors of a Fifth Generation (5G) system of a telecommunications network, cause the 5G system to perform operations comprising: receiving a registration request for 5G standalone (SA) coverage from a user equipment (UE), the 5G system providing 5G SA coverage; determining that Fourth Generation (4G) coverage from the telecommunications network is not available to the UE; and in response to determining that the 4G coverage is not available to the UE and regardless of whether 5G SA coverage is available to the UE, denying the registration request; wherein the determining includes receiving or retrieving, by an access and mobility management function (AMF) of the telecommunications network and from a mobility management entity (MME) of the telecommunications network, a list of unavailable eNodeBs (eNBs) in a same geographic area as the AMF.

16. The non-transitory computer storage medium of claim 15, wherein the 5G system includes a gNodeB (gNB), an access and mobility management function (AMF), or a combination of the gNB and the AMF.

17. The non-transitory computer storage medium of claim 15, wherein the determining includes:

providing, by the AMF, the list of unavailable eNBs to a gNodeB (gNB) of the telecommunications network; and receiving, by the AMF, from the gNB, an indication that 4G coverage is not available, the indication determined by the gNB based on the gNB determining that eNB(s) adjacent to the gNB are on the list of unavailable eNBs, wherein the AMF performs the denying of the registration request in response to receiving the indication.

* * * * *